US009367195B1

(12) United States Patent
Rabe et al.

(10) Patent No.: US 9,367,195 B1
(45) Date of Patent: Jun. 14, 2016

(54) DISPLAYING CURRENT LOCATION OF COMPONENTS IN A DATA STORAGE SYSTEM

(75) Inventors: Bruce R. Rabe, Dedham, MA (US);
Scott E. Joyce, Foxboro, MA (US);
James O. Pendergraft, Durham, NC (US)

(73) Assignee: EMC Corporation, Hopkinton, MA (US)

( * ) Notice: Subject to any disclaimer, the term of this patent is extended or adjusted under 35 U.S.C. 154(b) by 86 days.

(21) Appl. No.: 13/341,167

(22) Filed: Dec. 30, 2011

(51) Int. Cl.
*G06F 3/048* (2013.01)

(52) U.S. Cl.
CPC ..................................... *G06F 3/048* (2013.01)

(58) Field of Classification Search
CPC ....................................................... G06F 3/048
USPC ......................................................... 715/764
See application file for complete search history.

(56) References Cited

U.S. PATENT DOCUMENTS

| 2003/0079062 | A1* | 4/2003 | Sicola et al. ...................... 710/8 |
| 2006/0267984 | A1* | 11/2006 | Zohar ...................... H04L 41/22 345/440 |
| 2009/0012633 | A1* | 1/2009 | Liu .......................... G06F 1/206 700/90 |
| 2010/0080449 | A1* | 4/2010 | Yoshioka ....................... 382/155 |
| 2010/0184451 | A1* | 7/2010 | Wang et al. ................. 455/456.1 |
| 2010/0287485 | A1* | 11/2010 | Bertolami et al. ............ 715/764 |
| 2011/0218730 | A1* | 9/2011 | Rider ...................... G01C 21/00 701/533 |
| 2012/0015665 | A1* | 1/2012 | Farley et al. ............... 455/456.1 |

* cited by examiner

*Primary Examiner* — Jennifer To
*Assistant Examiner* — Xuyang Xia
(74) *Attorney, Agent, or Firm* — John T. Hurley; Jason A. Reyes; Krishnendu Gupta

(57) ABSTRACT

A method is used in displaying current location of components in a data storage system. An image of data storage equipment having multiple components is received at a mobile device. The image is processed to automatically identify the multiple components. A current relative physical positioning of the identified components within the data storage system is determined. Based on the determined positioning, a graphical view of the components is provided wherein the graphical view indicates a current relative physical positioning of the components within the data storage system.

16 Claims, 9 Drawing Sheets

DISPLAYING CURRENT LOCATION OF COMPONENTS IN A DATA STORAGE SYSTEM

TECHNICAL FIELD

The invention relates to displaying current location of components in a data storage system.

BACKGROUND OF THE INVENTION

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Computers, computer networks, and other computer-based systems are becoming increasingly important as part of the infrastructure of everyday life. Networks are used for sharing peripherals and files. In such systems, complex components are the most common sources of failure or instability. The proliferation of multiple interacting components leads to problems that are difficult or impossible to predict or prevent. The problems are compounded by the use of networks, which introduce the added complexity of multiple machines interacting in obscure and unforeseen ways.

Additionally, the need for high performance, high capacity IT systems is driven by several factors. In many industries, critical IT applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, modern data storage systems ("storage systems") are put to a variety of commercial uses. For example, they are coupled with host systems to store data for purposes of product development, and large storage systems are used by financial institutions to store critical data in large databases. For many uses to which such storage systems are put, it is highly important that they be highly reliable so that critical data is not lost or unavailable.

It will be appreciated that different tasks may be performed in connection with data storage systems. For example, software may be executed on the data storage systems in connection with performing data storage administration tasks such as for data storage configuration, management, and/or monitoring. The monitoring of data storage systems may include analyzing the health of the data storage system and investigating the cause of a failure in the data storage system when the data storage system fails to function successfully. The monitoring of the data storage system may be performed by services such as a data collection service, a configuration service and a performance analyzer service. For example, the data collection service may gather logs of the storage system ("system logs"), snapshots of the data storage system's memory, configuration and status information of the data storage system. It will be appreciated in case of a failure in such storage systems, it is useful that the information is investigated in a timely manner for preventing further failures in such storage systems.

However, it is also useful that potential problems in connection with data storage systems are identified before a failure or crisis situation arises. If a crisis situation is left to develop it may be too late to rectify the problem in the data storage system without causing disruption and inconvenience to the users of the data storage system.

In many organizations (e.g., companies), it is common to store equipment in racks, which typically house several components on different shelves therein. By storing components in racks, an organization can organize and optimize space utilization. The optimization and organization of space can be very important if the equipment must be stored under particular environmental conditions, such as low humidity and/or low temperature conditions. Under those conditions, a special room is usually dedicated to housing such environmentally sensitive equipment. In any event, it is not uncommon to have a room filled with multiple racks, each storing several components.

Keeping track of the location of each component can be a daunting, but necessary, task. If the organization desires to reconfigure its network, or if a particular component, such as a server, sends out an alert that a hardware component is about to fail, a system administrator must be able to locate the components quickly. System management software is available to help the system administrator monitor computer components such as servers, storage devices, and network routers, and to warn the system administrator if and when intervention is required for a particular component. For example, intervention would be necessary for environmental concerns (such as elevated temperatures in a portion of the equipment), hardware failures, and performance issues. System alerts can also include warnings of potential problems so that the system administrator can take preventive measures to avoid a catastrophic failure.

Typical system management software applications include a system management console program and a system management agent. The console program typically resides on the system administrator's workstation, and the management agent resides on the managed components. The system administrator is able to monitor each component through the cooperation between the console program and the management agent. The utility of such programs can be limited if the system administrator cannot identify the physical location of a component, particularly if the component is one of several hundred, or mounted in a rack that is in a room with dozens of other similar racks.

Systems for creating three-dimensional models of objects such as buildings are known in the art. Such systems allow the user to place features such as floors, ceilings, exterior walls, interior walls, doors, windows, columns or other support structures, and other suitable features in desired locations so as to create a three-dimensional model of a building or other suitable object. In addition, such systems allow a user to create views of the building or other object, such as to view the building or other object from a different perspective, to make a cut-away view through the object, or to otherwise change the view of the model.

Recent developments in integration technology have opened the way for the spread of various portable devices such as mobile phones and tablet computers that provide a variety of functions such as a digital camera function.

SUMMARY OF THE INVENTION

A method is used in displaying current location of components in a data storage system. An image of data storage equipment having multiple components is received at a mobile device. The image is processed to automatically identify the multiple components. A current relative physical positioning of the identified components within the data storage system is determined. Based on the determined positioning, a graphical view of the components is provided wherein the graphical view indicates a current relative physical positioning of the components within the data storage system.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Described below is a technique for use in displaying views of data storage equipment, which technique may be used to help provide, for example, displaying a current view of data storage components with respect to physical appearance and location within a cabinet rack as described below. In at least one implementation in accordance with the technique, a user can take a picture of a data storage cabinet using a mobile camera and related application. The picture can be used to automatically determine the cabinet configuration and persist the configuration so that a user does not need to manually modify the layout within a graphical user interface (GUI).

A cabinet discovery mode is provided, and when enabled, the application can blink light emitting diodes (LEDs) in a manner that uniquely identifies the enclosure. For example, LEDs can be controlled to blink rapidly so as to broadcast a component's serial number. Alternatively, LEDs can be enabled or disabled in a particular order to define the cabinet number in binary.

Figure 1:
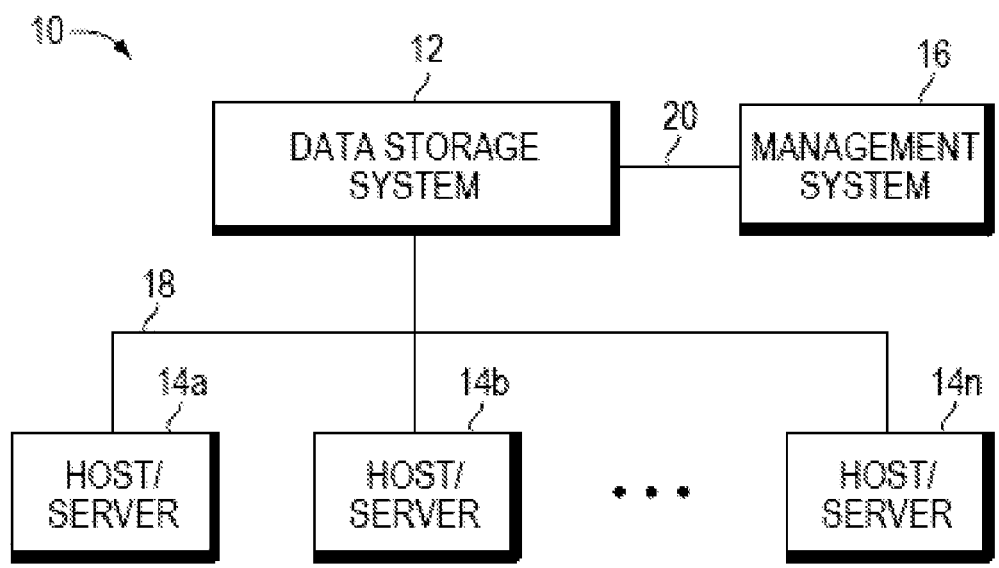
FIG. 1 is an example embodiment of a system that may be used with the techniques described herein.

Referring to FIG. 1, there is illustrated an example of a system that may be used in connection with performing the techniques as described herein. The system 10 includes a data storage system 12 connected to servers or host systems 14a-14n through a communication medium 18. It will be appreciated by those skilled in the art that the data storage system 12 may include one or more data storage systems such as one or more of the data storage systems offered by EMC Corporation of Hopkinton, Mass. The system 10 also includes a management system 16 connected to one or more data storage system 12 through a communication medium 20. In this embodiment, the management system 16, and the N servers or hosts 14a-14n may access the data storage system 12, for example, in performing input/output (I/O) operations, data requests, and other operations. The communication medium 18 and the communication medium 20 may be any one or more of a variety of networks or other type of communication connections as known to those skilled in the art. For example, the communication medium 18 and 20 may be a network connection, bus, and/or other type of data link, such as a hardwire or other connections known in the art.

Each of the host systems 14a-14n and the data storage system 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n, the management system 16 and data storage system may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as Connectrix® or other switching equipment that may exist such as a phone line, a repeater, a multiplexer or even a satellite. In one embodiment, the hosts may communicate with the data storage system over an iSCSI or a Fibre Channel connection and the management system may communicate with the data storage systems over a separate network connection using TCP/IP. It should be noted that although FIG. 1 illustrates communications between the hosts and data storage system being over a first connection, and communications between the management system and the data storage systems being over a second different connection, an embodiment may also use the same connection. The particular type and number of connections may vary in accordance with particulars of each embodiment.

Each of the host systems may perform different types of data operations in accordance with different types of tasks. In the embodiment of FIG. 1, any one of the host computers 14a-14n may issue a data request to the data storage system 12 to perform a data operation.

The management system 16 may be used in connection with management of the data storage system 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage system 12 of FIG. 1 may be an appliance with hardware and software for hosting the data storage of the one or more applications executing on the hosts 14a-14n. The appliance may include components such as one or more storage processors and one or more data storage devices upon which data is stored. The appliance may include software used in connection with storing the data of the hosts on the appliance and also software used in connection with retrieving data from the data storage system in connection with techniques described herein.

In connection with an embodiment in which the data storage system 12 is an appliance including hardware and software, the appliance may also include other software for performing different data services. For example, the appliance may include a data collection service which interacts with software on the hosts 14a-14n when performing a data collection operation on the data storage system 12.

In another embodiment, the data storage system 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems.

In such an embodiment in which the data storage system 12 of FIG. 1 is implemented using one or more data storage systems, each of the data storage systems may include code thereon for performing the techniques as described herein for supervising the data storage system.

Servers or host systems, such as 14a-14n, provide data and access control information through channels to the one or more storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Figure 2:
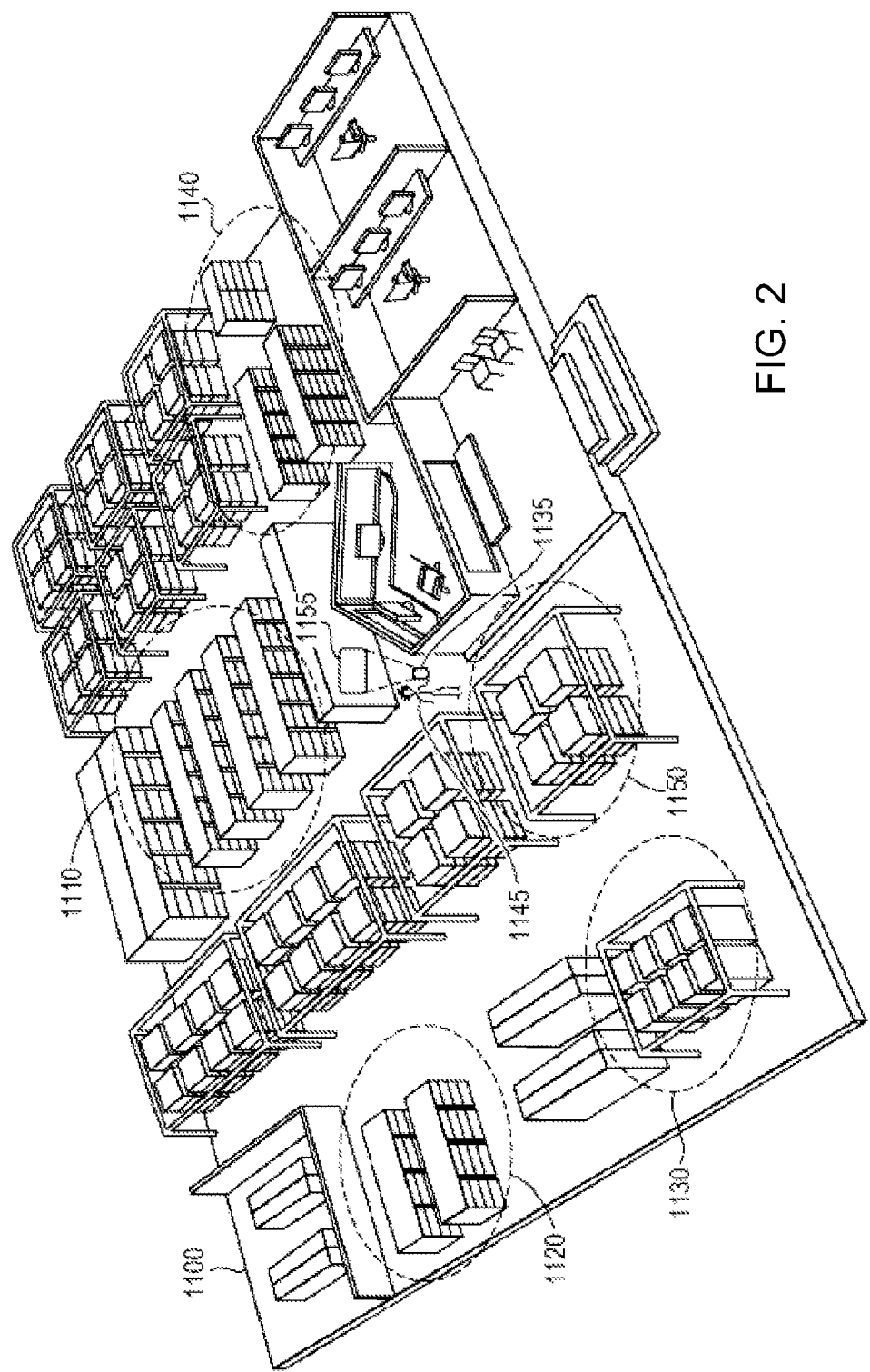
FIG. 2 illustrates an example of a data center that may be used with the technique described herein.

Referring now to FIG. 2, shown is an example of an embodiment of a computer system that may be used in connection with performing the technique or techniques described herein. Data center 1100 includes zones 1110, 1120, 1130, 1140, and 1150, wherein each zone may represent a grouping of storage component and/or a different type of data storage or processing. For example, zone 1110 may represent data processing or servers for virtual machines while zone 1150 may represent storage systems of database information.

As described in more detail below, in accordance with the technique described herein, user 1145 uses a portable computing device 1135 having a camera and a display to capture one or more still or video images of equipment 1155 of data center 1100, for use in automatic data storage system component positioning processing as described herein.

Device 1135 may include a mobile phone, smart phone, laptop computer, digital broadcast terminal, personal digital assistant (PDA), portable multimedia player (PMP), navigation system and/or the like. The technique described herein may also be applicable to other apparatus, such a stationary terminal as a digital TV, a desktop computer and/or the like.

Figure 3:
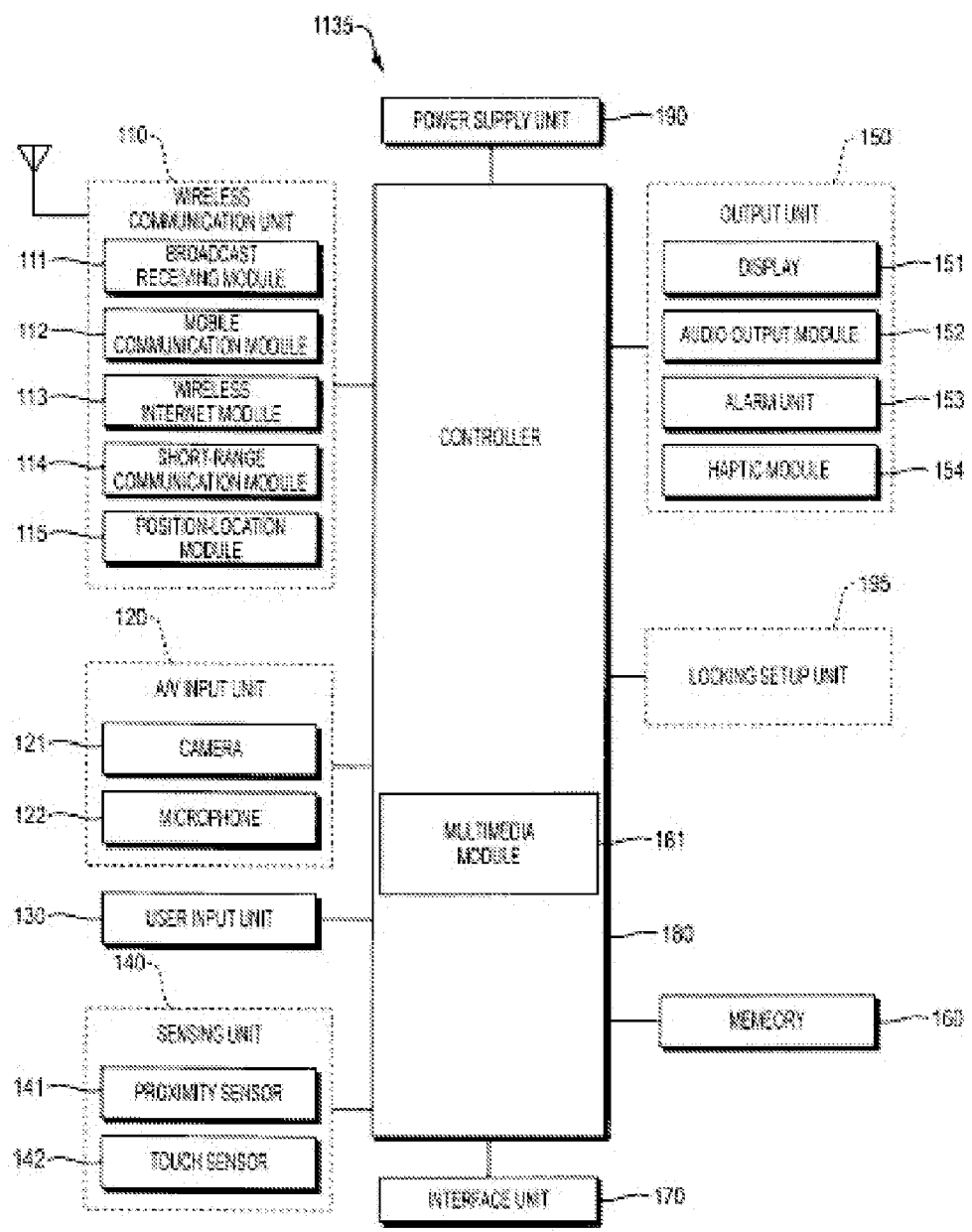
FIG. 3 is a block diagrams of an example device and system that may be used with the technique described herein.

FIG. 3 is a block diagram of device 1135 according to one example embodiment. Other embodiments, arrangements and configurations may also be provided.

As shown in FIG. 3, device 1135 may include a wireless communication unit 110, an A/V (audio/video) input unit 120, a user input unit 130, a sensing unit 140, an output unit 150 having a display 151, a memory 160, an interface unit 170, a controller 180, a power supply unit 190, a locking set-up unit 195 and the like. FIG. 3 shows device 1135 having various components, although all the illustrated components are not a requirement. Greater or fewer components may alternatively be implemented.

Wireless communication unit 110 may include one or more components that permit wireless communication between the device 1135 and a wireless communication system or network within which device 1135 is located. For example, the wireless communication unit 110 may include a broadcast receiving module 111, a mobile communication module 112, a wireless Internet module 113, a short-range communication module 114, a position-location module 115 and/or the like. The broadcast receiving module 111 may receive a broadcast signal and/or broadcast associated information from an external broadcast managing server via a broadcast channel, and the broadcast signal and/or broadcast associated information received by the broadcast receiving module 111 may be stored in a suitable device, such as the memory 160.

The mobile communication module 112 transmits/receives wireless signals to/from one or more network entities (e.g., base station, external terminal, server, etc.). Such wireless signals may represent audio, video, and data signals according to text/multimedia message transceivings, among others.

The wireless Internet module 113 supports Internet access for the device 1135. This module may be internally or externally coupled to the device 1135. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 may facilitate relatively short-range communications. Suitable technologies for implementing this module include radio frequency identification (RFID), infrared data association (IrDA), ultra-wideband (UWB), as well as the networking technologies commonly referred to as Bluetooth and ZigBee, to name a few.

The position-location module 115 may identify or otherwise obtain the location or position of the device 1135. This module may be implemented with a global positioning system (GPS) module.

The audio/video (A/V) input unit 120 may provide audio or video signal inputs to the device 1135. The A/V input unit 120 may include a camera 121 and a microphone 122. The camera 121 may receive and process image frames of still pictures or video that are obtained by an image sensor in a video call mode or a photographing mode. The processed image frames may be displayed on the display 151.

The image frames processed by the camera 121 may be stored in the memory 160 or may be externally transmitted via the wireless communication unit 110. At least two cameras 121 may be provided to the device 1135 based on environment of usage.

The microphone 122 may receive an external audio signal while the device 1135 is in a particular mode, such as phone call mode, a recording mode and/or a voice recognition mode. The audio signal may be processed and converted into electric audio data. The processed audio data may be transformed into a format transmittable to a mobile communication base station via the mobile communication module 112 in case of a call mode. The microphone 122 may include noise removing algorithms (or noise canceling algorithms) to remove or reduce noise generated in the course of receiving the external audio signal.

The user input unit 130 may generate input data responsive to user manipulation of an associated input device or devices. Examples of such devices may include a keypad, a dome switch, a touchpad (e.g., static pressure/capacitance), a jog wheel, a jog switch, etc.

The sensing unit 140 may provide sensing signals for controlling operations of the device 1135 using status measurements of various aspects of the device 1135. For example, the sensing unit 140 may detect an open/close status of the device 1135, relative positioning of components (e.g., a display and a keypad) of the device 1135, a position change of the device 1135 or a component of the device 1135, a presence or an absence of user contact with the device 1135, orientation or acceleration/deceleration of the device 1135. As an example, the device 1135 may be configured as a slide-type mobile terminal. The sensing unit 140 may sense whether a sliding portion of the device 1135 is open or closed. Other examples include the sensing unit 140 sensing presence or absence of power provided by the power supply 190, presence or absence of a coupling or other connection between the interface unit 170 and an external device. The sensing unit 140 may include a proximity sensor 141 and a touch sensor 142.

The output unit 150 may generate outputs relevant to senses of sight, hearing, touch and the like. The output unit 150 may include the display 151, an audio output module 152, an alarm 153 and a haptic module 154.

The display 151 may visually display (i.e., output) information associated with the device 1135. For example, if the device 1135 is operated in a phone call mode, the display 151 may provide a user interface (UI) or a graphical user interface (GUI) that includes information associated with placing, conducting, and/or terminating a phone call. If the device 1135 is in a video call mode or a photographing mode, the display 151 may additionally or alternatively display images that are associated with these modes, the UI or the GUI.

The display 151 may be implemented using known display technologies including, for example, a liquid crystal display (LCD), a thin film transistor-liquid crystal display (TFT-LCD), an organic light-emitting diode display (OLED), a flexible display and a three-dimensional (3-D) display. The device 1135 may include one or more of such displays.

Some of the displays may be implemented in a transparent or optical transmittive type that can be called a transparent display. A transparent OLED (or TOLED) may be an example of the transparent display. The display 151 may also be implemented as the optical transmittive type. In this configuration, a user may see an object in rear of a terminal body via an area occupied by the display 151 of the terminal body.

At least two displays 151 may be provided on the device 1135 based on the configuration of the device 1135. For example, a plurality of displays may be arranged on a single face of the device 1135 by being spaced apart from each other or by being built in one body. A plurality of displays may be arranged on different faces of the device 1135.

In a case that the display 151 and the touch sensor 141 for detecting a touch action are configured in a mutual layer structure (hereafter called a touch screen), the display 151 may be used as an input device as well as an output device. The touch sensor 142 may be configured as a touch film, a touch sheet, a touchpad and/or the like.

The touch sensor 142 may convert a pressure applied to a specific portion of the display 151 or a variation of a capacitance generated from a specific portion of the display 151 to an electric input signal. The touch sensor 142 may detect a pressure of a touch as well as a touched position or size. A separate pressure sensor may detect pressure of the touch.

If a touch input is provided to the touch sensor 142, signal(s) corresponding to the touch may be transferred to a touch controller. The touch controller may process the signal(s) and then transfer the processed signal(s) to the controller 180. The controller 180 may determine whether a prescribed portion of the display 151 is touched.

The proximity sensor 141 may be provided to an internal area of the device 1135 enclosed by the touch screen and/or around the touch screen. The proximity sensor 141 may detect a presence or non-presence of an object approaching a prescribed detecting surface or an object existing around the proximity sensor 141 using an electromagnetic field strength or infrared ray without mechanical contact. The proximity sensor 141 may have longer durability than a contact type sensor and may also have a wider utility than the contact type sensor.

The proximity sensor 141 may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. If the touch screen includes the electrostatic capacity proximity sensor, the proximity of a pointer may be detected using a variation of electric field according to proximity of the pointer. The touch screen (i.e., touch sensor) may be classified as the proximity sensor 141.

In the following description, an action that a pointer approaches without contacting the touch screen may be called a proximity touch. An action that a pointer actually touches the touch screen may be called a contact touch. The meaning of the position on the touch screen proximity-touched by the pointer may define a position of the pointer that vertically opposes the touch screen when the pointer performs the proximity touch.

The proximity sensor 141 may detect a proximity touch and a proximity touch pattern (e.g., a proximity touch distance, a proximity touch duration, a proximity touch position, a proximity touch shift state, etc.). Information corresponding to the detected proximity touch action and the detected proximity touch pattern may be outputted to the touch screen.

The audio output module 152 may function in various modes including a call-receiving mode, a call-placing mode, a recording mode, a voice recognition mode, a broadcast reception mode and/or the like to output audio data that is received from the wireless communication unit 110 or is stored in the memory 160. During operation, the audio output module 152 may output an audio signal relating to a particular function (e.g., a call received, a message received, etc.). The audio output module 152 may be implemented using one or more speakers, buzzers, other audio producing devices, and/or combinations thereof.

The alarm 153 may output a signal for announcing an occurrence of a particular event associated with the device 1135. Events may include a call received event, a message received event and a touch input received event. The alarm 153 may output a signal for announcing the event occurrence by way of vibration as well as video or audio signal. The video or audio signal may be outputted via the display 151 or the audio output unit 152. The display 151 or the audio output module 152 may be regarded as a part of the alarm 153.

The haptic module 154 may generate various tactile effects that can be sensed by a user. Vibration may be a representative one of the tactile effects generated by the haptic module 154. Strength and pattern of the vibration generated by the haptic module 154 may be controllable. For example, different vibrations may be outputted by being combined (or synthesized) together or may be outputted in sequence.

The haptic module 154 may generate various tactile effects as well as vibrations. For example, the haptic module 154 may generate an effect attributed to the arrangement of pins vertically moving against a contact skin surface, an effect attributed to injection/suction power of air through an injection/suction hole, an effect attributed to a skim over a skin surface, an effect attributed to a contact with an electrode, an effect attributed to an electrostatic force, an effect attributed to representation of warm/cold sense using an endothermic or exothermic device and/or the like.

The haptic module 154 may enable a user to sense a tactile effect through a muscle sense of a finger, an arm or the like as well as to transfer the tactile effect through a direct contact. At least two haptic modules 154 may be provided on the device 1135 based on a corresponding configuration type of the device 1135.

The memory 160 may store programs for operating the controller 180. The memory 160 may temporarily store input/output data such as phonebook data, message data, still image, and/or moving image. Data for various patterns of vibration and/or sound outputted in case of a touch input to the touch screen may be stored in the memory 160.

The memory 160 may be implemented using any type or combination of suitable volatile and non-volatile memories or storage devices including a hard disk, a random access memory (RAM), a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk, a multimedia card micro type memory, a card-type memory (e.g., SD memory, XD memory, etc.) and/or other similar memory or data storage device. The device 1135 may operate in association with web storage for performing a storage function of the memory 160 on the Internet.

The interface unit 170 may couple the device 1135 with external devices. The interface unit 170 may receive data from the external devices or may be supplied with power and then transfer the data or power to respective elements of the device 1135 or enable data within the device 1135 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module may be a chip for storing various kinds of information for authenticating a use authority of the device 1135 and may include a User Identify Module (UIM), a Subscriber Identity Module (SIM), a Universal Subscriber Identity Module (USIM) and/or the like. A device having an identity module (hereafter called an identity device) may be manufactured as a smart card. The identity device may be connectible to the device 1135 via a relevant port.

When device 1135 is connected to an external cradle, the interface unit 170 may become a passage for supplying the device 1135 with power from the cradle or a passage for delivering various command signals inputted from the cradle by a user to the device 1135. Each of the various command signals inputted from the cradle or the power may operate as a signal enabling the device 1135 to recognize if it is correctly loaded in the cradle.

The controller 180 may control overall operations of the device 1135. For example, the controller 180 may perform control and processing associated with voice calls, data communications, video calls, etc. The controller 180 may include a multimedia module 181 that provides multimedia playback. The multimedia module 181 may be configured as part of the controller 180, or may be implemented as a separate component. The controller 180 may have a time counting function.

The controller 180 may perform a pattern recognizing process for recognizing a writing input or a picture drawing input carried out on the touch screen as characters or images, respectively.

The power supply unit 190 may provide a power required by various components of the device 1135. The power may be internal power, external power, and/or a combination thereof.

Embodiments may be implemented in a computer-readable medium using, for example, computer software, hardware, and/or some combination thereof. For hardware implementation, embodiments may be implemented using one or more applications of specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform functions described herein, and/or a selective combination thereof. Embodiments may also be implemented by the controller 180.

For software implementation, embodiments may be implemented with separate software modules, such as procedures and functions, each of which may perform one or more of the functions and operations described herein. The software codes may be implemented with a software application written in any suitable programming language and may be stored in the memory 160, and executed by a controller or a processor, such as the controller 180.

Figure 4A:
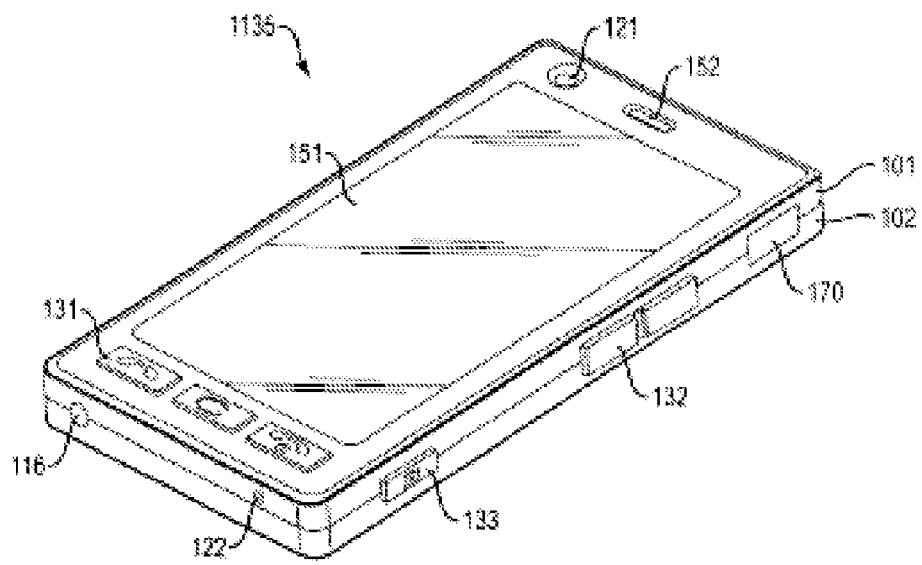
FIG. 4A is a perspective diagram of a front of the example device of FIG. 3.

FIG. 4A is a front view of device 1135 according to an example embodiment. Other embodiments, arrangements and configurations may also be provided.

As shown in FIG. 4A, the device 1135 may have a bar type terminal body. Embodiments of device 1135 may be implemented in a variety of other configurations. Examples of such configurations may include a folder-type, a slide-type, a bar-type, a rotational-type, a swing-type and/or combinations thereof.

The body may include a case (e.g., a casing, housing, or cover) that form an exterior of the device. The case may be divided into a front case 101 and a rear case 102. Various electric/electronic parts may be provided in a space between the front case 101 and the rear case 102.

The display 151, the audio output unit 152, the camera 121, the user input unit 130 (including first and second manipulation units 131, 132), the microphone 122, the interface unit 170 and the like may be provided on the device body, and more particularly may be provided on the front case 101.

The display 151 may occupy most of a main face of the front case 101. The audio output module 152 and the camera 121 may be provided at an area adjacent to one end portion of the display 151, while the first manipulation unit 131 and the microphone 122 may be provided at another area adjacent to the other end portion of the display 151. The second manipulation unit 132 and the interface unit 170 may be provided on lateral sides of the front and rear cases 101 and 102.

The user input unit 130 may receive a command for controlling an operation of the device 1135. The user input unit 130 may include the first and second manipulating units 131 and 132. The first and second manipulating units 131 and 132 may be called a manipulating portion and may adopt any mechanism of a tactile manner that enables a user to perform a manipulation action by experiencing a tactile feeling.

Content inputted by the first manipulating unit 131 or the second manipulating unit 132 may be diversely set. For example, a command such as a start, an end, a scroll and/or the like may be inputted to the first manipulating unit 131. A command for a volume adjustment of sound outputted from the audio output unit 152, a command for a switching to a touch recognizing mode of the display 151 and/or the like may be inputted to the second manipulating unit 132.

Figure 4B:
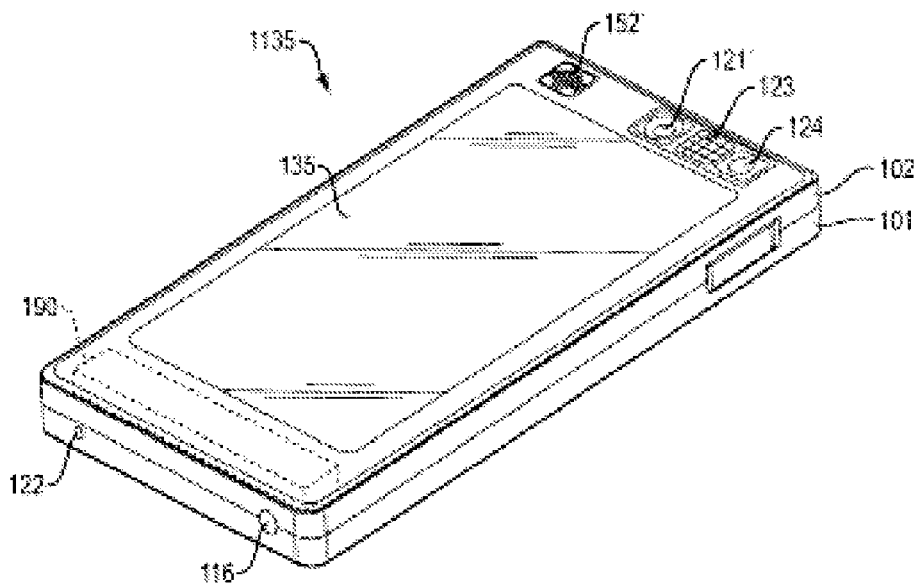
FIG. 4B is a perspective diagram of a backside of the example device of FIG. 3.

FIG. 4B is a perspective diagram of a backside of the device shown in FIG. 4A. Other embodiments, arrangements and configurations may also be provided.

As shown in FIG. 4B, a camera 121' may be additionally provided on a backside of the device body, and more particularly on the rear case 102. The camera 121' may have a photographing direction that is substantially opposite to a photographing direction of the camera 121 and may have pixels differing from pixels of the camera 121.

For example, the camera 121 may have a lower number of pixels to capture and transmit a picture of a user face for a video call, while the camera 121' may have a greater number of pixels for capturing a general subject for photography without transmitting the captured subject. Each of the cameras 121 and 121' may be provided on the device body to be rotated and/or popped up.

A flash 123 and a mirror 124 may be additionally provided adjacent to the camera 121'. The flash 123 may project light toward a subject in case of photographing the subject using the camera 121'. If a user attempts to take a picture of the user (i.e., self-photography) using the camera 121', the mirror 124 may enable the user to view a user face reflected by the mirror 124.

An additional audio output unit 152' may be provided on a backside of the device body. The additional audio output unit 152' may implement a stereo function together with the audio output unit 152 and may be used for implementation of a speakerphone mode in talking over the device 1135.

A broadcast signal receiving antenna 124 may be additionally provided at the lateral side of the device body as well as an antenna for communication or the like. The antenna 124 may be considered as a portion of the broadcast receiving module 111 and/or may be retractably provided on the device body.

The power supply unit 190 for supplying a power to the device 1135 may be provided with respect to the device body. The power supply unit 190 may be built within the device body. Alternatively, the power supply unit 190 may be detachably connected to the device body.

FIG. 4B also shows a touchpad 135 for detecting a touch that is additionally provided on the rear case 102. The touchpad 135 may be configured as a light transmittive type. If the display 151 outputs visual information from both faces, the display 151 may also recognize visual information via the touchpad 135. The information outputted from both of the faces may be controlled by the touchpad 135. Alternatively, a display may be further provided to the touchpad 135 so that a touchscreen may also be provided on the rear case 102.

The touchpad 135 may be activated by interconnecting with the display 151 of the front case 101. The touchpad 135 may be provided in rear of the display 151 and in parallel to one another. The touchpad 135 may have a size equal to or less than a size of the display 151.

With respect to operation in a data center, in general, a user may use camera 121 in a component positioning determination process involving equipment 1155. For example, a product type or other identification of equipment 1155 may be obtained from an image received from the camera 121. For example, the memory 160 may store shape information of characteristic external shapes of various data center equipment, and the controller 180 may obtain the product name of the equipment 1155 that is included in the image obtained from the camera 121 by using the shape information. Alternatively, a serial number or a bar code included in the image, or other mechanisms described below, may be used for identifying the equipment 1155.

If the controller 180 determines that the memory 160 does not have identifying information on the equipment 1155 (i.e., the information does not exist in the memory 160), the controller 180 may activate a module within the wireless communication unit 110 to obtain the product name or other identification from an external server such as an Internet server. The information may be obtained through a wireless connection. Further information on the equipment 1155 may then be obtained by using the product name. Such information may be previously stored in the memory 160 and/or may be downloaded through the Internet by activating a module within the wireless communication unit 110 and/or by using the obtained product name. Such information may then be manually stored in an external storage medium such as a desk-top computer and/or a personal computer.

If the user needs more information, the user may generate a selection signal, e.g., by selecting a dedicated key. The selection signal may be generated from the menu in a state that the image is displayed. If the selection signal is for connecting to another resource, a phone number related to the equipment 1155 may be automatically obtained by the controller 180. The phone number may be a phone number of the product company or may be a phone number of aftersales service (AS) center. If this phone number is stored in the memory 160, the controller 180 may search the memory 160 to obtain the phone number. If the phone number is not stored in the memory 160 (i.e., does not exist in the memory 160), the controller 180 may activate the wireless communication unit 110 to obtain the phone number through the Internet. The controller 180 may transmit a call signal to the phone number for a voice call, a video call, and/or a short message.

Figure 5:
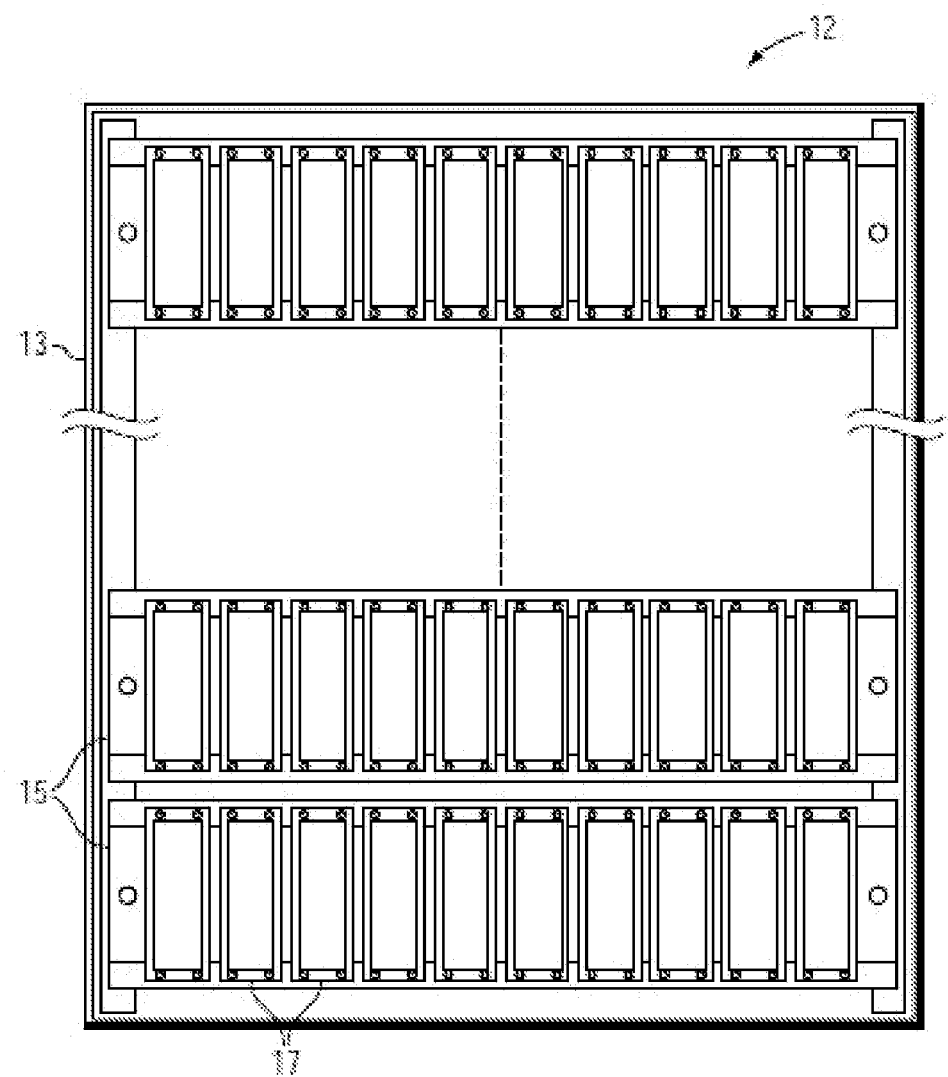
FIG. 5 is a diagram illustrating in more detail components of FIG. 1 that may be used with the techniques described herein.

Referring to FIG. 5, there is illustrated an example of a data storage system 12 in a system 10 that may be used in connection with performing the techniques as described herein. The data storage system comprises a rack mount cabinet 13 including several storage enclosures 15. Each storage enclosure 15 includes several data storage devices, for example, disk drives 17. The disk drives and the enclosures are preferably interconnected via a serial bus loop or ring architecture, e.g., Fibre Channel Arbitrated Loop (FC-AL).

Figure 6:
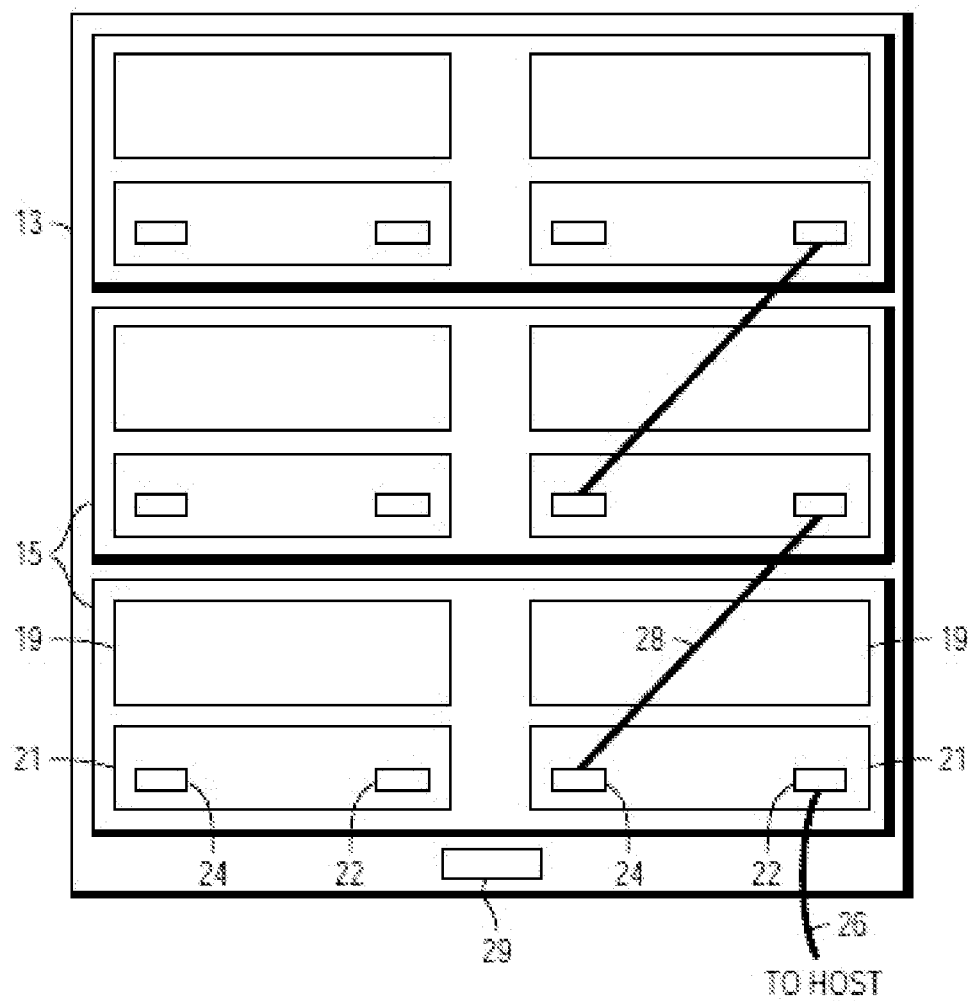
FIG. 6 is a diagram illustrating in more detail components of FIG. 1 that may be used with the techniques described herein.

Referring to FIG. 6, there is illustrated a rear view of the rack mount cabinet 13 and the storage enclosure 15. Each storage enclosure includes two power supplies 19, and two link control cards 21. The power supplies 19 and link control cards 21 are coupled to the disk drives 17 via a midplane within the chassis (not shown in FIG. 5). The link control card 21 serves to interconnect the disks and enclosures on the communication loop FC-AL.

Each link control card 21 includes a primary port 22 and an expansion port 24. These ports are used to link the storage enclosures together on a single communication loop FC-AL. A cable 26 may come from a host or from another storage system, and plugs into the primary port 22. The communication loop FC-AL extends from the primary port 22, is coupled to the disk drives 17, and continues out the expansion port 24. A cable 28 couples the expansion port 24 of a first storage enclosure 15 to the primary port 22 of a second storage enclosure 15. All the storage enclosures 15 are interconnected in this manner in a daisy chain to form the communication loop FC-AL. Thus, all the disk drives 17 are interconnected on the same communication loop FC-AL. Each link control card 21 is capable of controlling all the disks 17 in a given enclosure. The data storage system 12 may also include a peripheral device connector 29 that allows stand-alone peripheral devices to be connected thereto.

With reference again to FIG. 1, in accordance with the technique described herein, a user may use a computing device such as desktop computer or a mobile device such as a tablet or laptop computer, which computing device may be, include, or be included in, management system 16, in connection with the management of a data storage environment that may include, for example, system 12.

Figure 7:
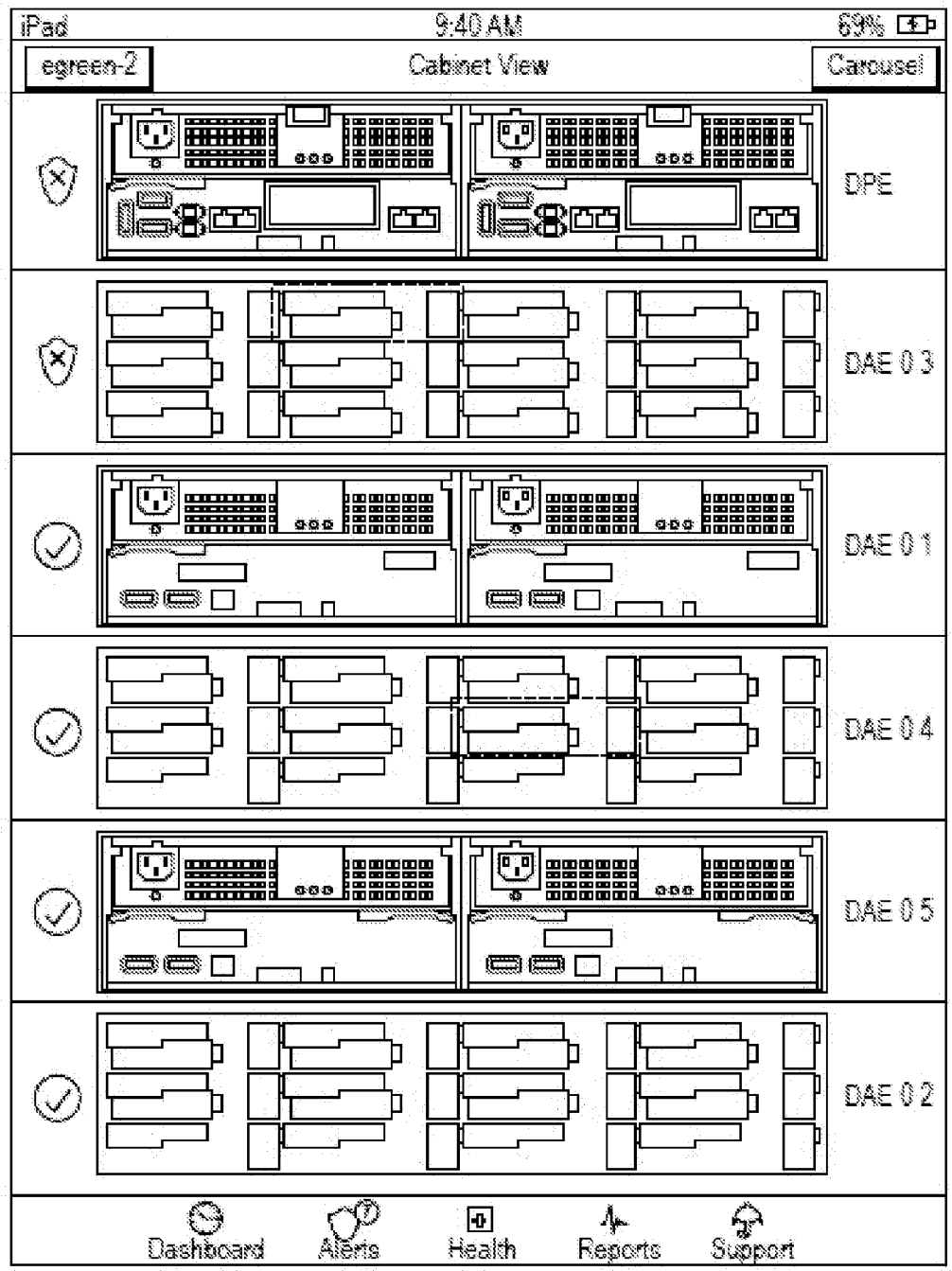
FIGS. 7 and 8 are illustrations of graphical interfaces that may be used with the techniques described herein.
Figure 8:
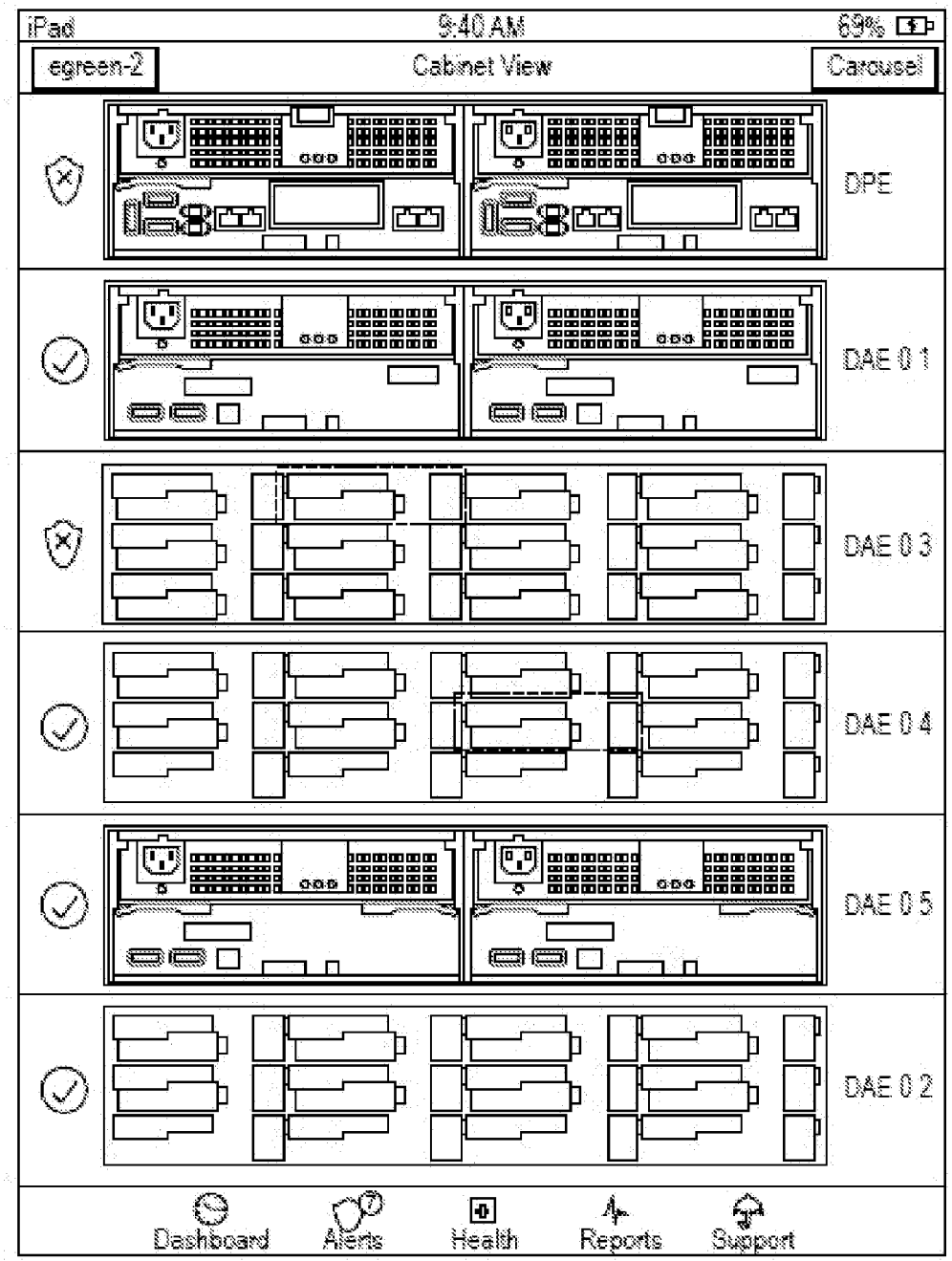

In an example implementation, with reference to FIGS. 7-8, a tablet runs an application to help manage the data storage environment, especially system 12. In the example implementation, the application has a dashboard, views, and functionality that may include views of at least system 12, red and green status markings, user drill in or down support, and support for the user to review alerts.

As shown in FIGS. 7-8, the application can provide, in a graphical user interface, a cabinet/rack view of a storage system such as system 12, wherein the view depicts physical placement of physical equipment or components of the system as described in more detail below. In at least some cases, the view uses photorealistic images of the equipment.

Preferably, in the graphical view, the individual component images are organized relative to each other in the same way that the corresponding physical components are positioned physically in the system that is the subject of the view. In an example embodiment, a mobile device, such as a tablet computer including a camera, may receive an image of data storage equipment having multiple components. The tablet computer may receive an image of the data storage equipment and process the image to automatically identify various components in the system's rack(s). The relative physical position of the identified components within the rack(s) is determined. With this information, a graphical view of the components is provided where the view provides physical position of the components relative to each other as they currently appear with the data storage system's rack(s).

Thus, for example as illustrated in FIG. 7, the application presents a resulting graphical view of the cabinet or rack where a disk processor enclosure (DPE) is located above disk array enclosure (DAE) 03 which is located above DAE 01, and so on. Properly configured, the view and other views depict how components currently appear (i.e., when the image was received), for physical positional purposes, when inspected from the front and the rear of the cabinet rack.

Such views have many useful applications, among which is enabling the system to guide a user or administrator graphically to the physical location of a component that needs attention, as shown by example through highlighting in FIG. 7 for respective disks of DAE 03 and DAE 04. For example, a drive can be highlighted in the view, and the user at the physical rack can locate the disk in the physical rack by comparing the view and the highlighting in the view to what the user sees from on-site inspection of the physical rack, and for example the user can then count down from the top and over from the left on the physical rack to identify the drive highlighted in the view, and then take appropriate action (e.g., replacement of the drive).

FIG. 8 illustrates an example in which the user makes a change to components with the rack. The current organization of components in the rack may not reflect a previously stored or default configuration due to a component change. The user may change system components for any multiple reasons, including component repair, adding additional components to expand storage capacity, removing components, swapping one component for another type component, and the like.

In the example of FIG. 8, the user may automatically display a current positional graphical view of the changes and the changes can be mapped to the system's logical components. Here, two components have swapped location. Thus, the display may automatically determine and update the view to reflect that the top to bottom order of equipment in the rack has changed from DPE, DAE 03, DAE 01, DAE 04, DAE 05, DAE 02 to DPE, DAE 01, DAE 03, DAE 04, DAE 05, DAE 02 (i.e., DAE 03 and DAE 01 have exchanged positions with each other). To do so in the example, the user captures an image of the components, and the mobile device (e.g., tablet computer) can process the image, reposition the components (i.e., DAE 03 and DAE 01) and present the current view using the tablet computer. Alternatively, or in addition, the mobile device may transmit information associated with the current view to a management system associated with the data storage system and/or store the information locally on the mobile device. The information may be tagged with other information such as temporal, system geographically (e.g., longitude/latitude) information, maintenance history, warranty details, and the like. The information may be transmitted directly or indirectly to the management system using known data transmission methods.

In at least one implementation, the application communicates with management system 16 to coordinate views with management information about system 12. In particular, the application or system 16 may map view-based information to the management information, so that, for example, system 16 is aware that system 12 (named "egreen-2") has equipment including a DPE and DAEs 01, 02, 03, 04, 05, and that, as specified by the view of FIG. 7, the equipment is physically organized from top to bottom in a rack in the following order: DPE, DAE 03, DAE 01, DAE 04, DAE 05, DAE 02.

Depending on the implementation, without the application or the view, system 16 may be aware that system 12 has DPE and DAEs 01, 02, 03, 04, 05, but may not be aware of the physical organization of DPE and DAEs 01, 02, 03, 04, 05. In such a case, the application and the view may provide the only source that system 16 has for at least some information about the physical organization of DPE and DAEs 01, 02, 03, 04, 05, and the user may automatically update the view whenever such physical organization is changed, so that the system 12 remains accurate and retains the ability to provide accurate guidance through the view to the user or administrator.

In at least some implementations, data describing the view is stored in a central location, e.g., in system 12 or system 16, so that other computing devices running the application or other applications can use such data to determine the physical organization of system 12.

The data storage environment may include multiple racks and/or storage systems, and the application may be used to determine and display the physical organization of components, and any related changes, throughout the data storage environment, including, for example, when a component is transferred from a first rack to a second rack, in which case the user can automatically update the view or views to reflect such transfer by capturing and processing images of the first and second rack.

In at least one implementation, the application may be provided with default views that correspond to the physical component organization that is in place when a rack and/or system 12 is delivered to a customer, which default views may then be updated as described above to reflect any subsequent changes made to the physical organization.

Figure 9:
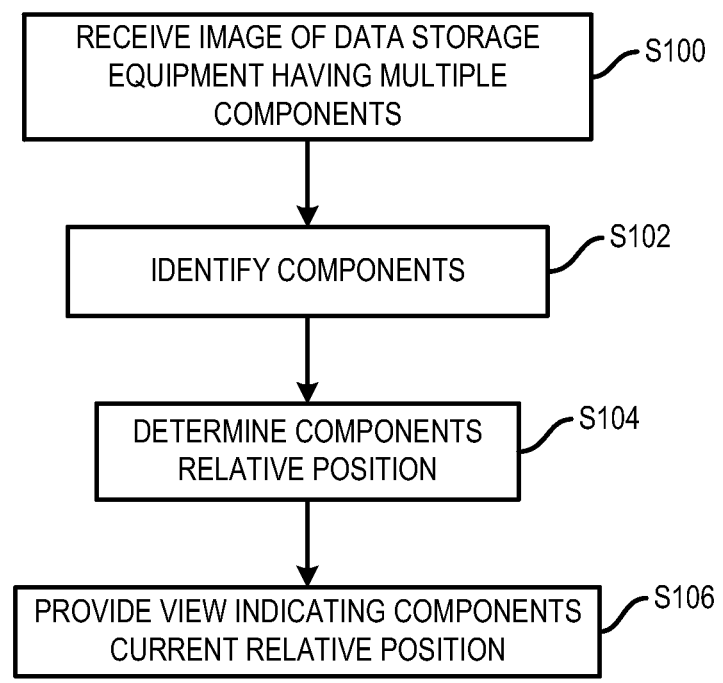
FIG. 9 is a flow diagram illustrating example embodiments of a method that may be used in connection with techniques described herein.

FIG. 9 is a flow diagram that illustrates an example method for displaying current location of components in a data storage system similar to that shown in FIG. 1. While various methods disclosed herein are shown in relation to a flowchart or flowcharts, it should be noted that any ordering of method steps implied by such flowcharts or the description thereof is not to be construed as limiting the method to performing the steps in that order. Rather, the various steps of each of the methods disclosed herein can be performed in any of a variety of sequences. In addition, as the illustrated flowcharts are merely example embodiments, various other methods that include additional steps or include fewer steps than illustrated are also within the scope of the present invention.

As shown, at step S100, an image of data storage system equipment having multiple components and/or racks may be received at a mobile device. The mobile device may generate the image using a self contained camera or may receive an image generated elsewhere. At step S102, the image may be processed to automatically identify the location of the data storage system's multiple components. At step S104, the method may determine a current relative physical positioning of the identified components within the data storage system. At step S106, based on the determination, a graphical view the components may be provided, wherein the graphical view indicates a current relative physical positioning of the components within the data storage system. The method may further include comparing the determined current relative physical positioning to stored physical positioning information and, based on the comparison, updating the stored component positioning information and/or the displayed view. Alternatively, or in addition, the information may be stored in a tabular format. Furthermore, the graphical view may be a cabinet rack view.

In alternative embodiments, a mobile device may be used to display the graphical view. Other alternative embodiments may include mapping logical identities of the components to physical positions of the components. Various methods may include activating from the data storage system an identifiable signal to facilitate identification of the data storage system. The identifiable signal may be, for example, a steady or flashing LED located on the component or data storage system and/or an audio signal generated by or near the data storage system. Other embodiments may include transmitting an activation signal from the mobile device to the data storage system.

In general, the application with its views allows a user to construct a conceptual framework, e.g., a hierarchical framework, representing a virtual or physical environment and then populate the environment with a collection of items. The application permits users to graphically and intuitively view and automatically generate various subsets of the environment's space as well as items placed within the modeled environment. In at least some cases, the user is also able to create and store tabular information describing the configuration of the graphical objects and the items represented by the graphical objects.

In an example implementation, the application is executed by a data processing system having an input device and display to provide features of the present technique. The application may read data from and store data in a database. Possible example embodiments of the application are also referred to herein as "tools." A definition tool of the application may be used to define components for a catalog for use in creating views. The definition tool may be used to define configured shelves of racks using empty shelves and components from the catalog and store configured shelves in a configuration library. In addition, the definition tool may be used to define configured racks from rails and configured shelves from the catalog and configuration library, respectively. Such configured racks (also referred to as racks) are stored in the configuration library.

Further in the example embodiment, a placement tool reads data from and stores data to the database. Specifically, the placement tool can be used to create footprints (i.e., equipment placed on floor space) by placing racks in sites. Such data is stored in a placement library. The placement tool may be used to create graphical and database representations of sites, buildings, floor, zones, rows (specifically row segments), and footprints. The placement tool may also be used to update both the graphical representations and the database data associated with these objects.

Data related to particular components may be used to configure shelves and may be stored in the product catalog. For example, a DAE may be an example of a type of component that is preferably represented in the product catalog. Other examples of components that can be represented in the product catalog are DPEs and disk drives.

A data entry process may be used to create items in the product catalog. A user selects the component type which in this example includes components, shelves and racks. Once a component type is selected, the user may specify values for each attribute presented in a predefined list of attributes that are applicable to the selected component type. Depending on the implementation, a different predefined list of attributes may be presented for each component type. Thus, a particular list of attributes is presented to the user, depending on the type of component selected. Generally, values for attributes are specified by either typing data directly into data entry fields or by selecting one or more predefined items from a pick list associated with the data attribute. It should also be noted that enhanced flexibility is provided by supporting definition of component attributes by a user. The user may also create appropriate predefined attribute values and constraints for attribute values.

Examples of attributes that can be specified include identifying attributes, physical attributes, electrical and connection attributes and status attributes. Identifying attributes include, for example, manufacturer's name, manufacturer's model number, service provider's identifier, bar code identifier, manufacture's part number, manufacturer's description, face label, equipment class code and equipment subclass code.

Physical attributes generally include height, width, depth, and weight. Typical electrical attributes include voltage type, a voltage quantity, current and current quantity. Further, in a preferred embodiment, additional data fields are included that indicate whether or not the attributes have been completely specified.

A similar process can be used to create a shelf configuration, to add components to a selected shelf, and to create a configured rack. In particular, a graphical representation may be automatically generated to reflect system changes including, for example, adding, moving and deleting shelves. In a particular implementation, users can use a camera enabled tablet computer or mobile phone to capture and automatically process an image of the system. After racks have been configured, the racks can be placed within a site.

The placement tool can update the database with specific information pertaining to the dimensions of the graphical object. For example, when a user creates or updates the graphical representation of a floor, the placement tool creates or updates non-graphical (logical) information in a floor points table. Thus, the graphical information may be stored in non-graphical (tabular) form, which is used to recreate the graphical representation of that information, so that a user can bring up and modify the floor at a future date.

Similar processes can be used to update the database with specific information pertaining to shelves, racks, and components.

Building or updating the views may depend on the system aiding the user in locating equipment, e.g., components stored in an equipment rack, so that the user is aware of how to build or update the view. A rack-mounted component locating system may be provided to allow each component to identify itself to a system administrator, so that, for example, the system administrator is made aware that DAE 04 is the fourth enclosure down from the top in the rack.

One method of locating or tracking the physical location of a component involves manually attaching a label, such as a bar code sticker, to each rack and/or component and scanning the bar code number with a reading device. A person operates the reading device to scan each component, or has the component moved past a stationary scanner. To allow system management software to be aware of the physical location of the component, the user performs the task of entering manually the identity and location of the component into the system. As components are added, relocated, removed, or replaced, the physical scanning or data entry methods are used again.

Another method of tracking the physical location of a component involves embedding an electrical memory device in the component and providing a physical connection, mechanical or electrical, between the enclosure and the component. When the component is placed in the enclosure, a system, which communicates with the enclosure, reads and stores the memory information of the component. The system then allows the user to enter search terms and the system illuminates an indicator light near the component, which matches the user's search criteria.

In general, a locating system may include a component being prompted, e.g., by system 16 and/or the application, to output a human perceptible signal locally to indicate a local position of the component. The signal is readily discernible by a human. For example, the human perceptible signal may be a visual signal outputted on an interface such as an LED or LCD display. The human perceptible signal readily discernible by a human is outputted local to the data storage system such that an expert or non-expert in the vicinity of the data storage system can ascertain immediately without difficulty a location of the component in connection with the data storage system. For example, the data storage system may comprise a rack mount cabinet. The human perceptible signal may be outputted on an interface on the front, back or side panels of the component in the rack. The technique as described herein enables a person skilled or otherwise to identify a location without difficulty. The technique offers a simple and easy way of identifying a location of a component without the need of having to connect into the component to ascertain its identity and location. The above technique is less time-consuming and easier than conventional approaches.

In at least one implementation, the human perceptible signal is a visual signal outputted on one or more interfaces that may be built-in or embedded in the data storage system so that the data storage system outputs the visual signal for enabling a person skilled or otherwise to readily identify the current location of the component in the data storage system. It will also be appreciated that the interfaces may output the visual signal in any form. The component may include a speaker as well or instead for outputting a human perceptible signal such as an audio signal. The signal may also, as just described, be an audio signal outputted on a speaker. Indeed, the visual signal and the audio signal may be outputted together. For example, the visual signal may be augmented by an audio signal. In the latter scenario, it may be that the location requires narrowing down by use of both signals.

While the signaling has been described with respect to outputting a human perceptible signal such as a visual signal on an interface, the signal may be outputted on an LED, e.g., with different colors depending on the need to differentiate location signals in the data storage system.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in displaying current location of components in a data storage system, the method comprising:

generating, at a mobile device, an image of data storage equipment having multiple data storage system components located in a storage system enclosure;

processing, on the mobile device, the image of data storage equipment to automatically identify individual components among the multiple data storage system components, wherein the individual components includes individual drives;

determining a current relative physical positioning information of the identified individual components within the data storage system enclosure;

storing the current relative physical positioning information of the identified individual components;

mapping the current relative physical positioning information of the identified individual components to corresponding logical components of the storage system;

based on the determination, generating and automatically displaying on the mobile device an updated graphical view the identified individual components wherein the graphical view indicates the current relative physical positioning of the individual components within the data storage system;

storing information associated with the graphical view in a management system associated with the data storage system;

comparing the determined current relative physical positioning to previously stored physical positioning information; and based on the comparison, updating the stored component positioning information.

2. The method of claim 1, wherein a mobile device is used to display the graphical view.

3. The method of claim 1, further comprising mapping logical identities of the components to physical positions of the components.

4. The method of claim 1, further comprising storing information associated with the graphical view in a tabular format.

5. The method of claim 1, wherein the graphical view is a cabinet rack view.

6. The method of claim 1, wherein the components comprise data storage devices.

7. The method of claim 1, further comprising activating from the data storage system an identifiable signal to facilitate identification of the data storage system, wherein the identifiable signal is at least one LED located on the component.

8. The method of claim 1, wherein the mobile device transmits an activating signal to the data storage system.

9. A system for use in displaying current location of components in a data storage system, the system comprising a mobile device configured to:

generate, at the mobile device, an image of data storage equipment having multiple data storage system components located in a storage system enclosure;

process, on the mobile device, the image of data storage equipment to automatically identify individual components among the multiple data storage system components, wherein the individual components includes individual drives;

determine a current relative physical positioning information of the identified individual components within the data storage system enclosure and store the current relative physical positioning information of the identified individual components and map the current relative physical positioning information of the identified individual components to corresponding logical components of the storage system;

based on the determination, generate and automatically display on the mobile device an updated graphical view the identified individual data storage system components wherein the graphical view indicates the current relative physical positioning of the individual components within the data storage system;

store information associated with the graphical view in a management system associated with the data storage system;

compare the determined current relative physical positioning to previously stored physical positioning information; and based on the comparison, updating the stored component positioning information.

10. The system of claim 9, wherein a mobile device is used to display the graphical view.

11. The system of claim 9, further configured to map logical identities of the components to physical positions of the components.

12. The system of claim 9, further configured to store information associated with the graphical view in a tabular format.

13. The system of claim 9, wherein the graphical view is a cabinet rack view.

14. The system of claim 9, wherein the components comprise data storage devices.

15. The system of claim 9, further configured to activate from the data storage system an identifiable signal to facilitate identification of the data storage system, wherein the identifiable signal is at least one LED located on the component.

16. The system of claim 9, wherein the mobile device transmits an activating signal to the data storage system.

* * * * *